United States Patent [19]

Bowyer

[11] Patent Number: 5,002,164
[45] Date of Patent: Mar. 26, 1991

[54] PUSH-ROD GUIDE FOR AIR-OPERATED DIAPHRAGM SPRING BRAKES

[75] Inventor: John P. Bowyer, Muskegon, Mich.

[73] Assignee: Lear Siegler Truck Products Corp., Muskegon, Mich.

[21] Appl. No.: 402,072

[22] Filed: Sep. 1, 1989

[51] Int. Cl.[5] ............................................. F16D 65/24
[52] U.S. Cl. .................................... 188/170; 92/5 R; 92/63; 92/130 A; 188/1.11; 188/153 D; 188/196 P; 303/9.76; 303/71
[58] Field of Search .............. 188/170, 196 P, 153 R, 188/153 D, 79.51, 79.55, 79.54, 198, 1.11; 303/71, 9.76; 92/130 A, 63, 64, 5 R; 116/208

[56] References Cited

U.S. PATENT DOCUMENTS

| | | | |
|---|---|---|---|
| 2,854,954 | 10/1958 | Howze | 92/130 A X |
| 3,359,869 | 12/1967 | Avrea | 188/1.11 X |
| 3,796,138 | 3/1974 | Doyle et al. | 188/170 X |
| 3,842,716 | 10/1974 | Swander, Jr. | 92/130 A X |
| 3,935,620 | 2/1976 | Carton | 92/63 X |
| 3,977,308 | 8/1976 | Swander, Jr. et al. | 92/130 A X |
| 4,364,305 | 12/1982 | Dalibout et al. | 188/170 X |
| 4,945,818 | 8/1990 | Ware | 188/170 X |

OTHER PUBLICATIONS

Reynolds, J. F. "Brakes", Reston Book, Prentice-Hall, Englewood Cliffs, New Jersey 07632, Chapter 17 Air Brakes, pp. 227-239, 1986.

Primary Examiner—Douglas C. Butler
Attorney, Agent, or Firm—Varnum, Riddering, Schmidt & Howlett

[57] ABSTRACT

An improvement in a conventional air-operated diaphragm spring brake is provided by a guide (100) being disposed in registry with an aperture (26) in a service brake housing (16). A push-rod (10) extends from a diaphragm (58) within the housing (12) through the bushing (102) to pivotably connect to a slack adjuster (6). The bushing (102) serves to maintain the push-rod (10) at a preselected angle relative to the slack adjuster (6) when the push-rod is in the inoperative position.

14 Claims, 2 Drawing Sheets

PUSH-ROD GUIDE FOR AIR-OPERATED DIAPHRAGM SPRING BRAKES

BACKGROUND OF THE INVENTION

1. Field of the Invention

This invention relates to air-operated diaphragm brakes of the type including a push-rod actuator and used with air brake systems on vehicles such as trucks. More particularly, the invention relates to a dust shield for preventing contaminants from entering the service brake chamber which also serves as a guide to maintain the push-rod in proper adjustment with respect to the slack adjuster.

2. State of the Prior Art

A typical air brake system for a vehicle such as a bus, truck or the like includes separate brake means such as a brake shoe and drum at the vehicle wheels. The brake shoes are actuated in one direction to apply the brakes and in the other direction to release the brakes. The brake means may serve as both service and emergency brakes, and individual brake actuators are located adjacent the wheels for actuation of the brake means.

A typical brake actuator includes a service brake actuator for applying and releasing the brakes in response to delivery and exhaust of compressed air. Often a spring brake actuator is disposed in tandem with the service brake actuator. The spring brake actuator uses the force of a strong compression spring to operate the service brake actuator and to apply the brakes when air in a spring chamber is reduced below some predetermined level. Air may be reduced in the spring brake actuator under the control of the operator in the manner of a parking brake, or automatically in emergencies such as a failure of portions of the brake air system.

Brake actuators typically employ diaphragms that move in response to air pressure and springs. The diaphragms in turn move push-rods in reciprocating fashion which move the brake means between operative and inoperative positions. Typically, the push-rod is pivotally attached to a slack adjuster which is splined to a camshaft on which a cam causes the brake shoes to be forced against the brake drum as the cam is rotated. The slack adjuster acts as a lever to amplify the force generated by air pressure in the brake actuator.

The push-rod typically extends through an aperture in the brake actuator. Because the aperture is in open communication with the interior of the brake actuator, dust shields are frequently employed to prevent contaminants from entering the interior of the brake actuator. Such dust shields are typically flexible neoprene or rubber boots which move as the push-rod reciprocates and articulates.

Under heavy use, the push-rod sometimes abrades against the edges of the aperture which causes undue wear on the push-rod and may lead to premature failure. Also, when the push-rod is in the inoperative position, i.e., when the brakes are released, the push-rod may not be in the proper position for an automatic slack adjuster to maintain the brakes at the optimum adjustment. Typically, a preselected optimum angle is determined between the slack adjuster and the push-rod when the push-rod is in the inoperative position, and if this angle is not maintained, the automatic slack adjuster may maintain inaccurate adjustments.

SUMMARY OF THE INVENTION

The invention is directed to an improvement in an air-operated diaphragm brake comprising a housing defining a chamber and having a push-rod opening in communication with the chamber. In conventional fashion, a push-rod extends from the chamber through the opening and has an outer end exterior to the chamber which is adapted to pivotably connected to a slack adjuster. The slack adjuster typically has a radial centerline extending from the axis of rotation of the slack adjuster through the pivot point. A diaphragm is disposed within the chamber for actuating the push-rod along a generally longitudinal axis thereof in a stroke between operative and inoperative positions. The longitudinal axis and the radial centerline together define a preset angle when the push-rod is in the inoperative position. According to the invention, a bushing is fixedly mounted with respect to the housing in registry with the opening and in slidable engagement with the push-rod for generally maintaining the preset angle whenever the push-rod is returned to the inoperative position so that the slack adjuster can maintain optimum adjustment of the push-rod stroke.

Preferably, the bushing is mounted within the opening. The bushing is formed of high-density polyethylene to provide a low-friction guide surface for the push-rod.

Further, the bushing has an aperture with a diameter slightly larger than the largest diameter of the push-rod to provide a dust shield for the opening in the housing. In mounting the bushing within the opening, the bushing has a first annular shoulder which abuts the housing.

A conventional air-operated diaphragm brake has a spring mounted within the housing having a first end adjacent the diaphragm and a second end adjacent the housing to bias the diaphragm and the push-rod to an inoperative position. In one aspect of the invention, the bushing has a second annular shoulder disposed to receive the second end of the spring to hold the bushing in place and whereby the second end of the spring can also be centered about the aperture. In another aspect of the invention, the portion of the bushing adjacent the aperture is chamfered.

DETAILED DESCRIPTION OF THE DRAWINGS

Figure 1:
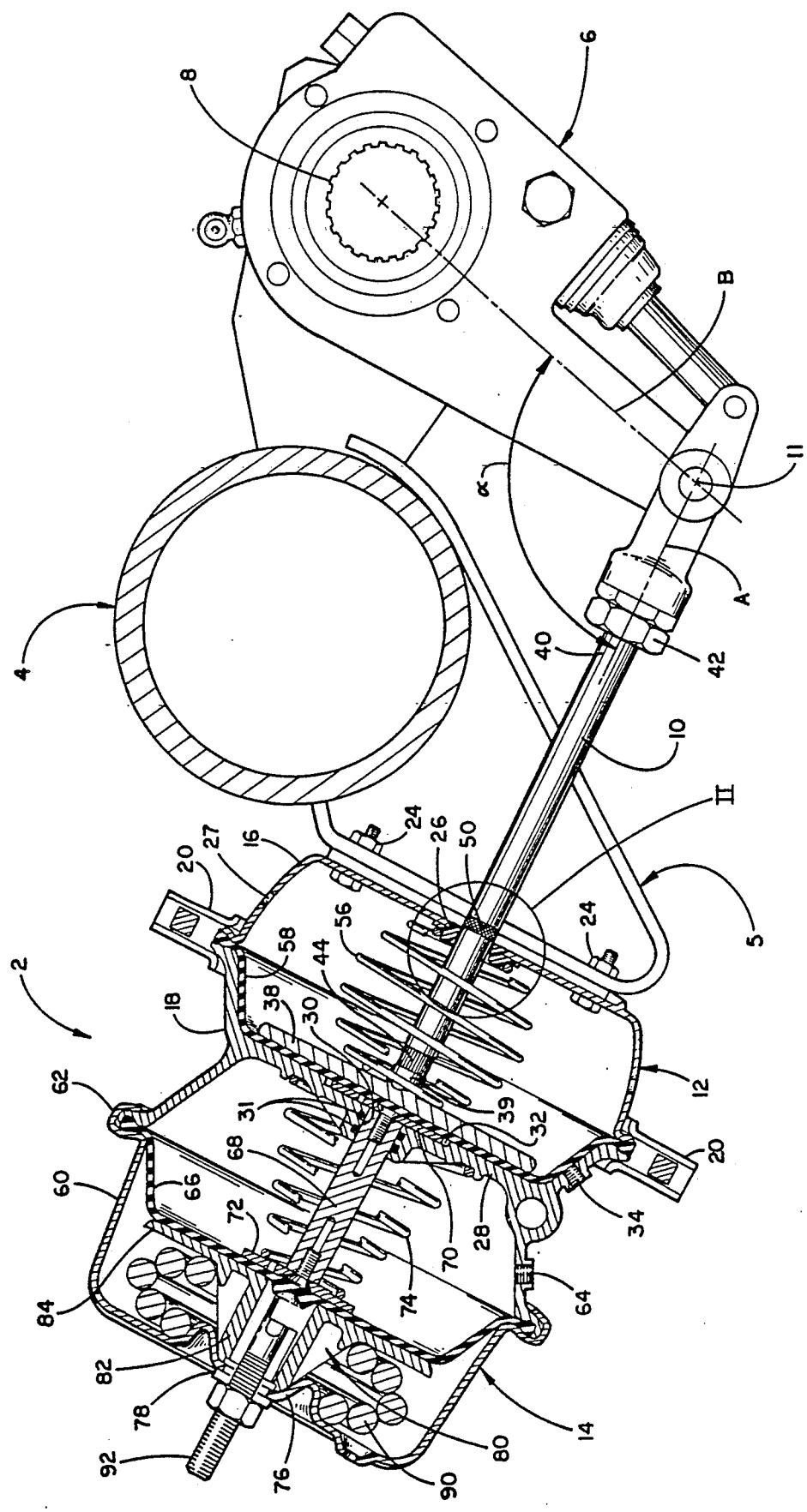
FIG. 1 is a cross-sectional view of an air-operated diaphragm spring brake having a push-rod guide means according to the invention.

Referring now to the drawings and to FIG. 1 in particular, there is shown an air-operated diaphragm brake 2 of a type well known in the art. The brake 2 is mounted to an axle 4 of a vehicle (not shown) by means of a mounting bracket 5. The brake 2 is further adapted to operate a conventional brake shoe and drum (not shown) by means of a slack adjustor 6 splined to a camshaft 8 in conventional fashion. The push-rod 10 extends to and pivotally connects with the slack adjuster 6 by suitable pivoting means 11.

It will be apparent that an angle α is defined by the pivotable connection 11 between the longitudinal axis A of the push-rod 10 and an axis B defined between the hinge point of the pivoting means 11 and the longitudinal axis of the camshaft 8. On a typical air-operated diaphragm brake system, the angle α is preselected by the manufacturer. In the illustrated embodiment, the angle α is preferably 105 degrees when the brakes are in the inoperative position as hereinafter described.

The air-operated diaphragm brake 2 comprises a service brake chamber 12 and a spring brake chamber 14 joined in tandem. The service brake chamber 12 comprises a cup-shaped service housing 16 and a double-cup shaped service/spring adapter housing 18 joined by a clamp 20 and forming a hollow interior chamber. A rolled lip or similar integral forming means may be substituted for the clamp 20. Bolts 24 are provided to fasten the housing 16 to the brackets on the axle 4. A central opening 26 and side openings 27 are also provided in the service housing 16.

The service/spring adapter housing 18 forms a divider wall 28 and has a central opening 30 with one or more O-rings 31 positioned therein. An indentation or annular depression 32 is formed around the opening 30. An aperture 34 is provided in the adapter housing 18 for providing communication between a source of pressure (not shown) and the interior of the service brake chamber 12.

The service brake push-rod 10 is mounted in the service brake chamber 12 for reciprocation within the opening 26 and carries a pressure plate 38 at an inner end 39 thereof. An outer end 40 of the push-rod 10 is journaled into a bracket means 42 for connection to the braking system. A first indicium 44 is integral with the push-rod 10 near the pressure plate 38 and so positioned on the push-rod that it will begin to emerge from the opening 26 when the push-rod 10 has approximately one-half inch of stroke remaining as it moves to an operative position in a manner described hereinafter.

A second indicium 50 may likewise be integral with the push-rod 10 and located intermediate the first indicium 44 and the outer end 40.

A compression spring 56 extends between a central portion of the service housing 16 and the pressure plate 38 to bias the pressure plate 38 and thus the service brake push-rod 10 to the fully retracted position as viewed in FIG. 1. The fully retracted position may be defined as the inoperative position in which the brakes are released. A first elastomeric diaphragm 58 (also known as the service brake diaphragm) is mounted within the service brake chamber 12 and is clamped between the service housing 16 and the service/spring adapter housing 18. The spring-biased pressure plate 38 forces the diaphragm 58 against the divider wall 28 of the service/spring adapter housing 18 to the inoperative position as shown in FIG. 1.

When air is supplied through the aperture 34 as, for example, when the brakes are applied by a vehicle operator, air pressure is introduced between the diaphragm 58 and the divider wall 28, thereby forcing the diaphragm 58 toward the central portion of the service housing 16. In this manner, the push-rod 10 is reciprocated to an operative position causing the slack adjuster 6 to act as a lever so that the camshaft 8 rotates applying braking pressure to the vehicle brake shoes and drum in a conventional fashion. Thus, the operative position is the maximum adjusted extension of the push-rod exterior to the service brake housing.

As the first indicium 44 begins to be visible from the exterior of the opening 26, it serves to visually indicate that the brakes are substantially out of adjustment. The second indicium 50 serves to alert the operator or mechanic that there is a first indicium 44 on the push-rod 10 within the housing 12 when the brakes are normally adjusted. Further, the second indicium 50 may alert the operator or mechanic to the fact that the push-rod 10 may be unable to return to a normal position when the brakes are released. Thus, if the second indicium 50 is not adjacent the opening 26 when the push-rod is in the inoperative position, an otherwise undetected problem may have occurred. For example, a malfunctioning slack adjustor, insufficient air pressure, a broken spring or binding foundation brake components may prevent the normal positioning of the push-rod 10 and cause premature wear, excessive heat and other complications which reduce breaking efficiency.

The spring brake chamber 14 comprises a side of the service/spring adapter housing 18 and a spring housing 60 which is secured to the service/spring adapter housing 18 by a formed seal 62. Alternatively, a clamp similar to claim 20 may be used to secure the spring housing to the service/spring adapter bearing 18. An aperture 64 is provided within the service/spring adapter housing 18 to connect the interior of the spring brake chamber 14 with a source of pressure (not shown). A second elastomeric diaphragm 66 (known as the spring diaphragm) is suspended within the spring brake chamber 14 between the service/spring adapter housing 18 and the spring housing 60. An adapter push-rod 68 is mounted within the spring brake chamber 14 and has a reaction plate 70 attached to one end, and a pressure plate 72 attached to the other end thereof. The adapter push-rod 68 extends through the opening 30 in sealing engagement with the O-ring 31. The reaction plate 70 seats within the annular depression 32 of the divider wall 28. A compression spring 74 is mounted within the spring chamber 14 between the divider wall 28 and the reaction plate 70 to bias the adapter push-rod 68 into an inoperative position as illustrated in FIG. 1.

The spring housing 60 has formed in a central portion thereof a cup portion 76 which defines a central opening 78. A receptacle plate 80 may have a conical portion 82 within an outer surface which complements the cup portion 76 and further has a pressure plate 84 at an inner portion thereof which bears against the diaphragm 66. A strong force compression spring 90 is positioned between the pressure plate 84 and the spring housing 16 to bias the push-rod 10 to an operative position. Ordinarily, air pressure within the spring brake chamber 14 combined with the biasing force of compression spring 74 overcomes the force of the compression spring 90 to maintain the latter in a retracted position as illustrated in FIG. 1.

A release tool 92 may be provided within the central opening 78 of the cone receptacle 76 by mechanically drawing the receptacle plate 80 back into the fully retracted position illustrated in FIG. 1 in the event of an air pressure failure within the spring chamber 14, or if there is a need to cage the compression spring 90 in order to dismantle the spring brake for service.

In operation of the spring brake, air pressure is continually supplied to a portion of the spring brake chamber 14 between the service/spring adapter housing 18 and the diaphragm 66 to maintain the spring diaphragm 66, and thus the push-rod 10, essentially in the retracted position illustrated in FIG. 1. In this position, the push-rod 10 normally would be operated as described above by selective pressurization of air into the service brake chamber through the aperture 34. However, in the event of failure of the air pressure system or by application of a parking brake (not shown), the pressure in the spring chamber will be decreased so that the springs 56, 74 would no longer be able to overcome the force of the much larger and stronger compression spring 90. Thus, the pressure plate 72 forces the spring diaphragm 66, and thus the adapter push-rod 68 in a direction along a longitudinal axis of the push-rod 68, thereby also forcing the push-rod 10 to an operative position applying the braking pressure to the brakes.

It will be readily apparent that as the push-rod 10 reciprocates and the pivot means 11 travels in an arc about the longitudinal axis of the camshaft 8, the push-rod 10 will also normally articulate, at least about the hinge means 11. A guide means 100 is provided within the aperture 26 through which the push-rod 10 reciprocates to provide a second point about which the push-rod 10 may articulate as well as to guide the push-rod in its reciprocation. The guide means need not necessarily be within the aperture, but preferably fixed relative to the aperture and spaced from the hinge means 11 to provide a second articulation point.

Figure 2:
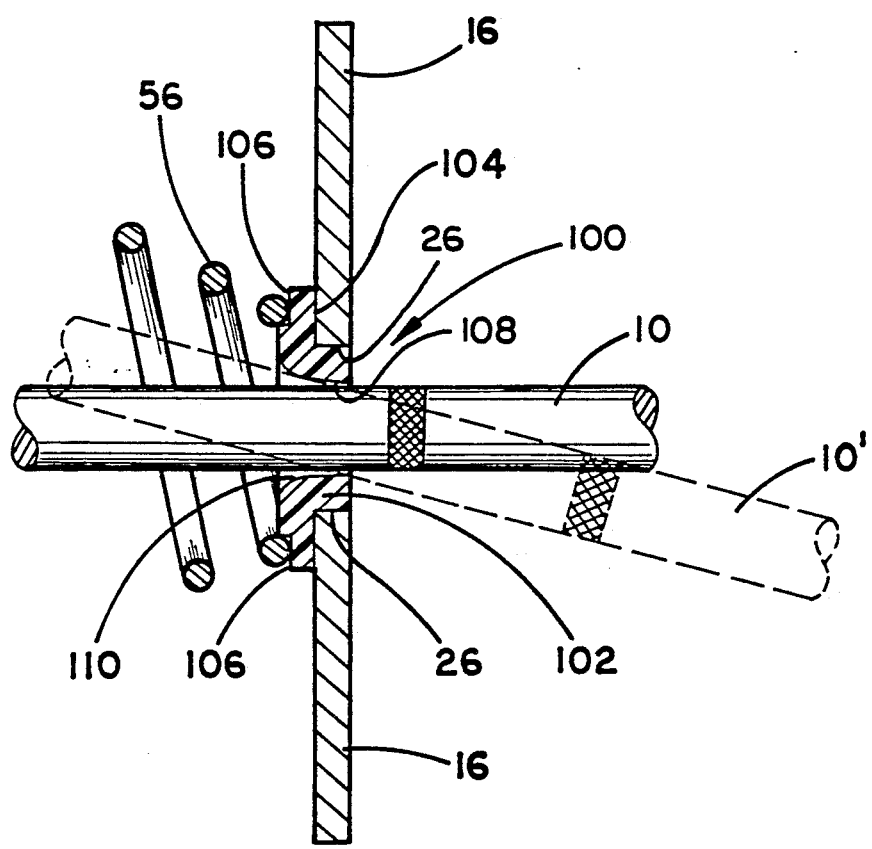
FIG. 2 is an enlarged cross-sectional view of the guide means of FIG. 1.

The guide means 100 can be seen in more detail in FIG. 2. The guide means 100 comprises a generally inflexible, high-density polyethylene bushing having two oppositely disposed annular shoulders 104, 106. Any suitable wear-resistant material may be provided for the bushing which has lubricating properties. High-density polyethylene is used because it has these qualities. A first annular shoulder 104 abuts the interior surface of the service housing 16, and the second annular shoulder 106 receives an end of the compression spring 56. The compression spring 56 thus effectively holds the bushing 102 in place within the aperture 26. Additionally, the shoulder 106 tends to keep the spring 56 centered about the aperture 26 and the push-rod 10 so that the push-rod 10 has less tendency toward misalignment. An aperture 108 in the bushing slightly larger in diameter than the largest thread diameter of the push-rod 10 receives the push-rod and permits the push-rod to freely reciprocate therein. The portion of the bushing 102 facing the interior of the service chamber 12 may be chamfered as at 110 to facilitate articulation of the push-rod 10 within the aperture 108 as illustrated by the position of the push-rod 10' in phantom.

With this structure, the guide means 100 keeps the push-rod 10 generally centered within the aperture 26 as the push-rod moves. Thus, when the push-rod 10 is retracted to the inoperative position (brakes released), the angle α will be generally maintained at the preselected optimum value. In addition, when the guide means 100 is disposed within the aperture 26, it inhibits penetration of contaminants into the interior of the service brake housing 12 through the aperture in the manner of a conventional dust shield. Further, it prevents the push-rod 10 from abrading against the edges of the aperture 26, prolonging the life of the components.

Reasonable variation and modification are possible within the scope of the foregoing disclosure without departing from the spirit of the invention as defined in the appended claims.

The embodiments of the invention in which an exclusive property or privilege is claimed are defined as follows:

1. In an air-operated diaphragm spring brake comprising:
    a housing defining a chamber and having a push-rod opening in communication therewith;
    a push-rod extending from the chamber through the opening and having an outer end exterior to the chamber and, which is adapted to pivotably connect to a slack adjuster, said slack adjuster having a radial centerline extending from the axis of rotation of the slack adjuster through the pivotable connection; and
    a diaphragm within the chamber for actuating the push-rod along a generally longitudinal axis thereof in a stroke between operative and inoperative positions, said longitudinal axis and said radial centerline defining a preset angle when the push-rod is in the inoperative position, the improvement which comprises:
    a bushing fixedly mounted with respect to the housing in registry with the opening and in slidable engagement with the push-rod for generally maintaining the preset angle whenever the push-rod is returned to the inoperative position so that the slack adjuster can maintain optimum adjustment of the push-rod stroke.

2. An air-operated diaphragm brake according to claim 1 wherein the bushing is mounted within the opening.

3. An air-operated diaphragm brake according to claim 2 wherein the bushing is formed of a high density polyethylene to provide a low-friction guide surface for the push-rod.

4. An air-operated diaphragm brake according to claim 3 wherein the bushing has an aperture with a diameter slightly larger than the largest diameter of the push-rod to provide a dust shield for the opening in the housing.

5. An air-operated diaphragm brake according to claim 4 wherein the bushing has a first annular shoulder which abuts the housing.

6. An air-operated diaphragm brake according to claim 5 and further comprising a spring having a first end adjacent the diaphragm and a second end adjacent the housing to bias the diaphragm and the push-rod toward the inoperative position wherein the bushing has a second annular shoulder disposed to receive the second end of the spring to hold the bushing in place and whereby the second end of the spring is centered about the aperture.

7. An air-operated diaphragm brake according to claim 6 wherein a portion of the bushing adjacent the aperture is chamfered.

8. An air-operated diaphragm brake according to claim 2 wherein the bushing has an aperture with a diameter slightly larger than the largest diameter of the push-rod to provide a dust shield for the opening in the housing.

9. An air-operated diaphragm brake according to claim 8 wherein the bushing has a first annular shoulder which abuts the housing.

10. An air-operated diaphragm brake according to claim 9 and further comprising a spring having a first end adjacent the diaphragm and a second end adjacent the housing to bias the diaphragm and the push-rod toward the inoperative position wherein the bushing has a second annular shoulder disposed to receive the second end of the spring to hold the bushing in place and whereby the second end of the spring is centered about the aperture.

11. An air-operated diaphragm brake according to claim 10 wherein a portion of the bushing adjacent the aperture is chamfered.

12. An air-operated diaphragm brake according to claim 2 wherein the bushing has a first annular shoulder which abuts the housing.

13. An air-operated diaphragm brake according to claim 12 and further comprising a spring having a first end adjacent the diaphragm and a second end adjacent the housing to bias the diaphragm and the push-rod toward the inoperative position wherein the bushing has a second annular shoulder disposed to receive the second end of the spring to hold the bushing in place and whereby the second end of the spring is centered about the aperture.

14. An air-operated diaphragm brake according to claim 1 and further comprising a spring having a first end adjacent the diaphragm and a second end adjacent the housing to bias the diaphragm and the push-rod toward the inoperative position wherein the guide means is disposed to receive the second end of the spring to hold the guide means in place.

* * * * *